(12) United States Patent
Cho et al.

(10) Patent No.: US 12,374,085 B2
(45) Date of Patent: Jul. 29, 2025

(54) SELF-DIRECTED VISUAL INTELLIGENCE SYSTEM

(71) Applicant: Korea Electronics Technology Institute, Seongnam-si (KR)

(72) Inventors: Choong Sang Cho, Seongnam-si (KR); Ju Hong Yoon, Hwaseong-si (KR); Young Han Lee, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 437 days.

(21) Appl. No.: 17/968,986

(22) Filed: Oct. 19, 2022

(65) Prior Publication Data

US 2024/0062522 A1 Feb. 22, 2024

(30) Foreign Application Priority Data

Aug. 17, 2022 (KR) .................. 10-2022-0102769

(51) Int. Cl.
*G06V 10/774* (2022.01)
*G06V 20/40* (2022.01)

(52) U.S. Cl.
CPC .......... *G06V 10/774* (2022.01); *G06V 20/46* (2022.01)

(58) Field of Classification Search
None
See application file for complete search history.

(56) References Cited

U.S. PATENT DOCUMENTS

| 2018/0082127 | A1 | 3/2018 | Carlson et al. |
| 2021/0133588 | A1* | 5/2021 | Wong ..................... G06N 3/063 |
| 2021/0182618 | A1 | 6/2021 | Hoffmann et al. |
| 2021/0406604 | A1* | 12/2021 | Collberg ............. G06F 18/2148 |

FOREIGN PATENT DOCUMENTS

KR 10-2020-0075069 A 6/2020

OTHER PUBLICATIONS

Korean Office Action issued on Apr. 23, 2024, in counterpart Korean Patent Application No. 10-2022-0102769 (7 pages in English, 10 pages in Korean).

* cited by examiner

*Primary Examiner* — Leon Flores
(74) *Attorney, Agent, or Firm* — NSIP Law (57) ABSTRACT

There is provided a self-directed visual intelligence system, The self-directed visual intelligence system according to an embodiment prepares data necessary for training a visual intelligence model when a change in a visual context of a real world is recognized, configures a visual intelligence model and configures training data of the visual intelligence model, based on the changed visual context of the real world, trains the configured visual intelligence model with the training data, and evaluates performance of the trained visual intelligence model. Accordingly, the visual intelligence model is corrected/improved in a self-directed way according to a change in a visual context of a real world, and is grown/advanced by itself, so that performance of the visual intelligence model is maintained in a best state even in response to any change in the context of the real world.

17 Claims, 9 Drawing Sheets

```
BACKBONE NETWORK:
SELF-SUPERVISED LEARNING
```

```
INCREASED FEW-SHOT LEARNING
```

```
PSEUDO-LABELING-BASED TRAINING
```

SELF-DIRECTED VISUAL INTELLIGENCE SYSTEM

CROSS-REFERENCE TO RELATED APPLICATION(S) AND CLAIM OF PRIORITY

This application is based on and claims priority under 35 U.S.C. § 119 to Korean Patent Application No. 10-2022-0102769, filed on Aug. 17, 2022, in the Korean Intellectual Property Office, the disclosure of which is herein incorporated by reference in its entirety.

BACKGROUND

Field

The disclosure relates to an artificial intelligence (AI) technology, and more particularly, to a visual intelligence system which grows in a self-directed way by analyzing visual data like a video, an image, or the like.

Description of Related Art

A visual intelligence model refers to an AI model that performs object recognition, behavior recognition, context recognition, emotion recognition by analyzing visual data, and is typically implemented by a deep learning model. In order to train the visual intelligence model, training data should be established.

A visual context in the real world which is analyzed by the visual intelligence model may continuously change, and such a change in the visual context in the real world may degrade performance of the visual intelligence model. To solve this problem, the visual intelligence model should be corrected/improved.

The visual intelligence model may be correct/improved by a developer, and correcting/improving may be difficult to perform, and also, obtaining training data for learning a changed visual context may be a troublesome problem.

Furthermore, if the change in the visual context of the real world is continuous, the demand for correcting/improving of the visual intelligence model may also be continuous, and thus, it may be difficult and hard to manage the visual intelligence model.

SUMMARY

To address the above-discussed deficiencies of the prior art, it is a primary object of the disclosure to provide a visual intelligence system which grows while correcting/improving a visual intelligence model in a self-directed way according to a change in a visual context of a real world.

According to an embodiment of the disclosure to achieve the above-described objects, a self-directed visual intelligence system includes: a training preparation module configured to prepare data necessary for training a visual intelligence model when a change in a visual context of a real world is recognized; a configuration module configured to configure a visual intelligence model and to configure training data of the visual intelligence model, based on the changed visual context of the real world; a first training module configured to train the visual intelligence model configured by the configuration module with the training data configured by the configuration module; and a first verification module configured to evaluate performance of the visual intelligence model trained by the first training module.

The training preparation module may include: a change recognition module configured to recognize the change in the visual context of the real world, based on a scene change in visual data regarding the real world; and a collection module configured to collect data necessary for training the visual intelligence model when the change in the visual context of the real world is recognized by the change recognition module, and the change recognition module may configure a scene graph from the visual data regarding the real world, may extract a feature vector of the scene graph and may determine a scene change, when the scene change is determined, may derive a changed factor from the scene graph, and may recognize the change in the visual context of the real world, based on the determined scene change and the derived changed factor, and the collection module may select important data from the visual data of the real world, and may generate enrichment data by enriching a part of the visual data of the real world.

The configuration module may include: a model determination module configured to determine a backbone network and visual intelligence engines to configure the visual intelligence model, based on the changed visual context of the real world; and a training data configuration module configured to configure training data from the data prepared by the training preparation module, based on the changed visual context of the real world, and the change in the visual context of the real world may be a change in at least one of an object and an environment of the real world, the visual intelligence engines may include at least one of an object recognition engine, a region division engine, a behavior recognition engine, an emotion recognition engine, and the training data may include at least one of training data which is configured by extracting the important data and the enrichment data which are appropriate for few-shot learning based on the changed object, training data which increases according to an increasing method appropriate for the changed environment, and pseudo-labeling-based training data which is for training the visual intelligence engines.

The configuration module may reconfigure a visual intelligence model and training data when a result of verifying by the first verification module is negative.

According to an embodiment of the disclosure, the self-directed visual intelligence system may further include a second training module configured to train the visual intelligence model trained by the first training module by using the visual data of the real world when a result of verifying by the first verification module is positive.

The second training module may derive visual style information regarding an environment of the real world from visual data of the real world, may select visual data for active learning of the visual intelligence model from training data generated by converting the already owned training data based on the derived visual style information, and from the visual data of the real world, and may train the visual intelligence model with training data in which correct answer data is added to the selected visual data.

According to an embodiment of the disclosure, the self-directed visual intelligence system may further include a second verification module configured to evaluate performance of the visual intelligence model trained by the second training module, and the configuration module may reconfigure a visual intelligence model and training data when a result of verifying by the second verification module is negative.

The second verification module may evaluate the performance of the visual intelligence model by statically analyzing response information of the real world as to a result of visual recognition/perception which is generated by inputting the visual data of the real world to the trained visual intelligence model.

The second verification module may transmit a result of statically analyzing to the configuration module, and the configuration module may refer to the result of statically analyzing in configuring the visual intelligence model and the training data.

According to another embodiment of the disclosure, a self-directed visual intelligence model operating method includes: a training preparation step of preparing data necessary for training a visual intelligence model when a change in a visual context of a real world is recognized; a configuration step of configuring a visual intelligence model and configuring training data of the visual intelligence model, based on the changed visual context of the real world; a first training step of training the visual intelligence model configured at the configuration step with the training data configured at the configuration step; and a first verification step of evaluating performance of the visual intelligence model trained at the first training step.

According to another embodiment of the disclosure, a self-directed visual intelligence system includes: a configuration module configured to configure a visual intelligence model and to configure training data of the visual intelligence model, based on a visual context of a real world; a first training module configured to train the visual intelligence model configured by the configuration module with the training data configured by the configuration module; a first verification module configured to evaluate performance of the visual intelligence model trained by the first training module; a second training module configured to train the visual intelligence model trained by the first training module by using the visual data of the real world when a result of verifying by the first verification module is positive; and a second verification module configured to evaluate performance of the visual intelligence model trained by the second training module.

According to another embodiment of the disclosure, a self-directed visual intelligence model operating method includes: a configuration step of configuring a visual intelligence model and configuring training data of the visual intelligence model, based on a visual context of a real world; a first training step of training the visual intelligence model configured at the configuration step with the training data configured at the configuration step; a first verification step of evaluating performance of the visual intelligence model trained at the first training step; a second training step of training the visual intelligence model trained at the first training step by using the visual data of the real world when a result of verifying at the first verification step is positive; and a second verification step of evaluating performance of the visual intelligence model trained at the second training step.

According to embodiments of the disclosure as described above, a visual intelligence model may be corrected/improved in a self-directed way according to a change in a visual context of a real world, and may be grown/advanced by itself, so that performance of the visual intelligence model may be maintained in a best state even in response to any change in the context of the real world.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

An embodiment of the disclosure proposes a self-directed visual intelligence system. The self-directed visual intelligence system according to an embodiment corrects/improves a visual intelligence model in a self-directed way according to a change in a visual context of a real world.

Specifically, the self-directed visual intelligence system according to an embodiment may formulate a hypothesis and may configure and train a visual intelligence model when a visual context of a real world is changed, and, when the hypothesis is verified, may optimize the visual intelligence model for the real world and verify the visual intelligence model.

The visual intelligence model is an AI model that performs object recognition, behavior recognition, context recognition, emotion recognition, or the like, and may be trained by visual data and training data which is configured as a result of perception/recognition.

Figure 1:
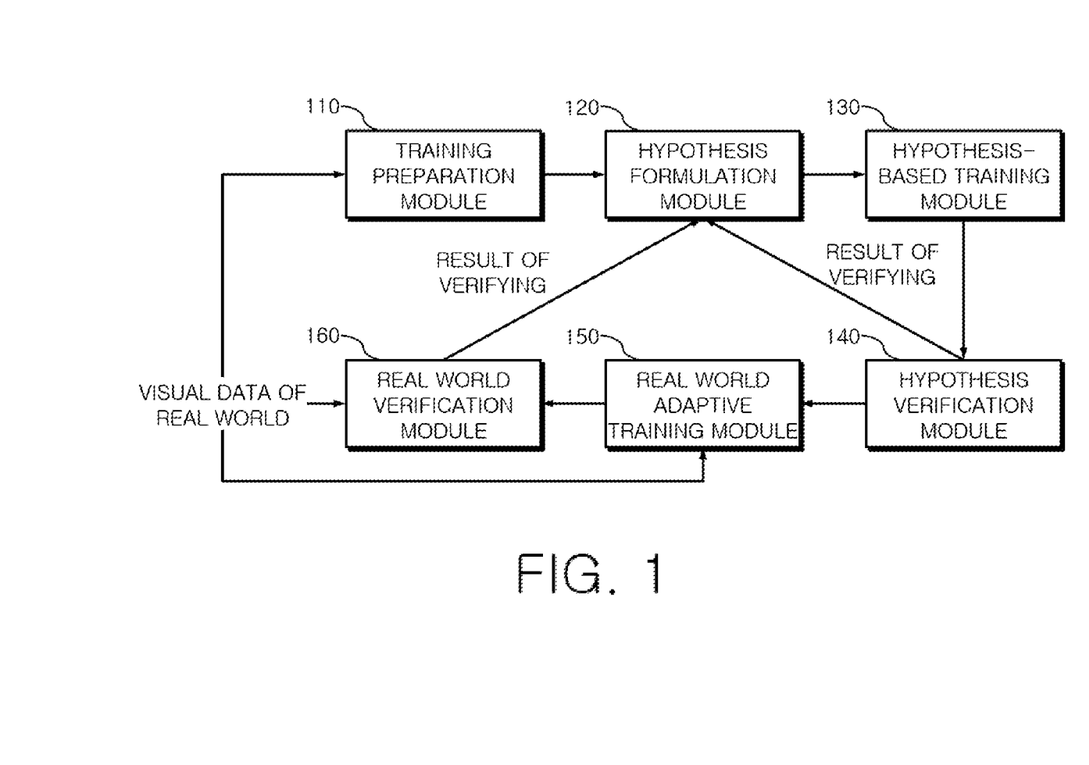
FIG. 1 is a view illustrating a configuration of a self-directed visual intelligence system according to an embodiment of the disclosure.

FIG. 1 is a view illustrating a configuration of a self-directed visual intelligence system according to an embodiment. The self-directed visual intelligence system according to an embodiment may include a training preparation module 110, a hypothesis formulation module 120, a hypothesis-based training module 130, a hypothesis verification module 140, a real-world adaptive training module 150, and a real-world verification module 160.

The training preparation module 110 may be a module that recognizes a change in a visual context of the real world, and prepares data necessary for training the visual intelligence model. The data may be prepared when a change in the visual context of the real world is recognized. The change in the visual context of the real world may refer to a change in an object appearing in the real world and/or an environment of the real world, and the visual intelligence model may be required to be corrected/improved due to the change in the visual context of the real world.

The hypothesis formulation module 120 may be a module that formulates a hypothesis for correcting/improving the visual intelligence model in order to respond to the change in the visual context of the real world, which is recognized by the training preparation module 110. Specifically, the hypothesis formulation module 120 may be a module that configures the visual intelligence model based on the change in the visual context of the real world, and configures training data for the visual intelligence model.

The hypothesis-based training module 130 may train the visual intelligence model according to the hypothesis formulated by the hypothesis formulation module 120. To achieve this, the hypothesis-based training module 130 may train the visual intelligence model configured by the hypothesis formulation module 120 with training data configured by the hypothesis formulation module 120.

The hypothesis verification module 140 may be a module that verifies whether the hypothesis formulated by the hypothesis formulation module 120 is valid, by evaluating performance of the visual intelligence model trained by the hypothesis-based training module 130.

When a result of verifying by the hypothesis verification module 140 is negative, reformulating by the hypothesis formulation module 120, retraining by the hypothesis-based training module 130, and reverifying by the hypothesis verification module 140 may be performed.

On the other hand, when the result of verifying by the hypothesis verification module 140 is positive, the real-world adaptive training module 150 may train the visual intelligence model trained by the hypothesis-based training module 140 to be optimized for visual data of the real world.

The real-world verification module 160 may be a module that verifies whether the hypothesis formulated by the hypothesis formulation module 120 is valid again, by evaluating performance of the visual intelligence model trained by the real-world adaptive training module 150.

When a result of verifying by the real-world verification module 160 is negative, reformulating by the hypothesis formulation module 120, retraining by the hypothesis-based training module 130, reverifying by the hypothesis verification module 140, retraining by the real-world adaptive training module 150, and reverifying by the real-world verification module 160 may be performed.

Hereinafter, the respective modules 110 to 160 constituting the self-directed visual intelligence system shown in FIG. 1 will be described in detail one by one.

Figure 2:
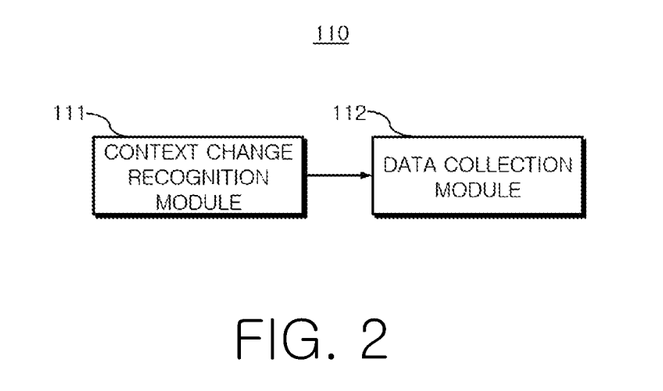
FIG. 2 is a view illustrating a configuration of a training preparation module.

FIG. 2 is a view illustrating a configuration of the training preparation module 110. As shown in the drawing, the training preparation module 110 may include a context change recognition module 111 and a data collection module 112.

Figure 3:
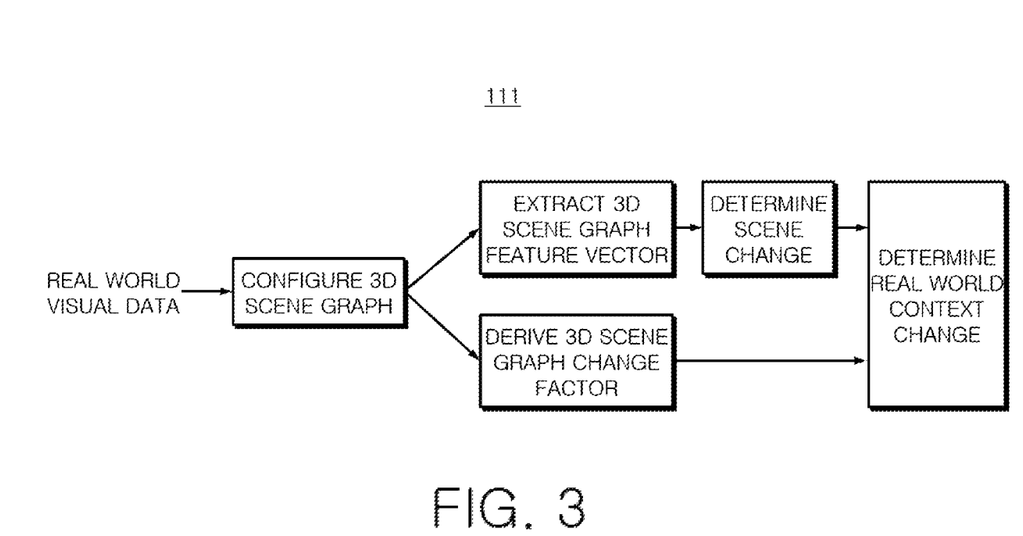
FIG. 3 is a view provided to explain a function of a context change recognition module.

The context change recognition module 111 may recognize a change in a visual context of a real world, based on a scene change/factor in visual data of the real world. FIG. 3 is a view provided to explain a function of the context change recognition module 111.

As shown in the drawing, the context change recognition module 111 may configure a 3D scene graph from the visual data of the real world. In addition, the context change recognition module 111 may extract a feature vector of the 3D scene graph, and may determine a scene change by determining a change in the extracted feature vector.

When the scene change is determined, the context change recognition module 111 may derive a changed factor from the 3D scene graph. Next, the context change recognition module 111 may determine a change in the context of the real world, based on the scene change and the change factor.

Figure 4:
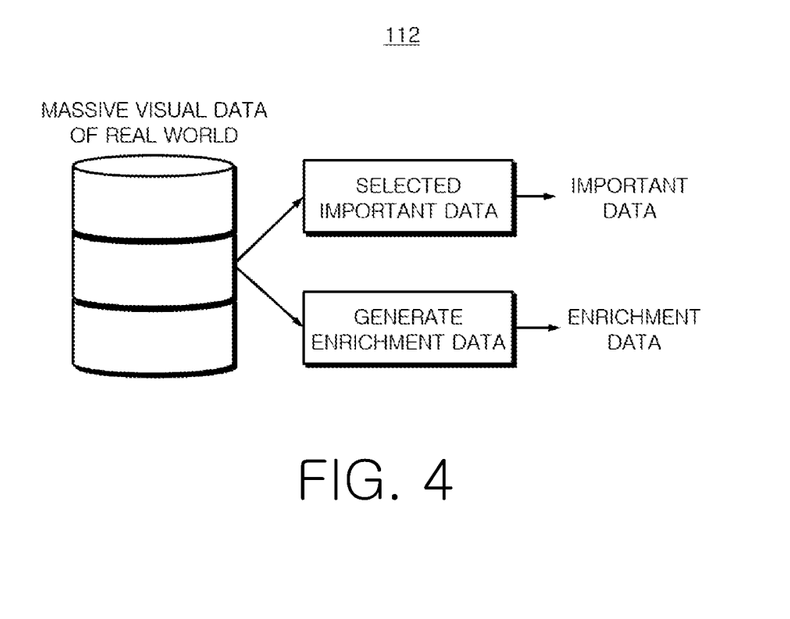
FIG. 4 is a view provided to explain a function of a data collection module.

Reference will be made back to FIG. 2. When the change in the context of the real world is recognized by the context change recognition module 111, the data collection module 112 may collect data necessary for training the visual intelligence model. FIG. 4 is a view provided to explain a function of the data collection module 112.

As shown in the drawing, the data collection module 112 may select important data including main information from massive visual data of the real world, and may generate enrichment data by enriching some pieces of visual data of the real world.

Selecting and enriching data may be for maximizing learning performance of the visual intelligence model in reducing an amount of training data to be extracted from the massive visual data of the real world.

Figure 5:
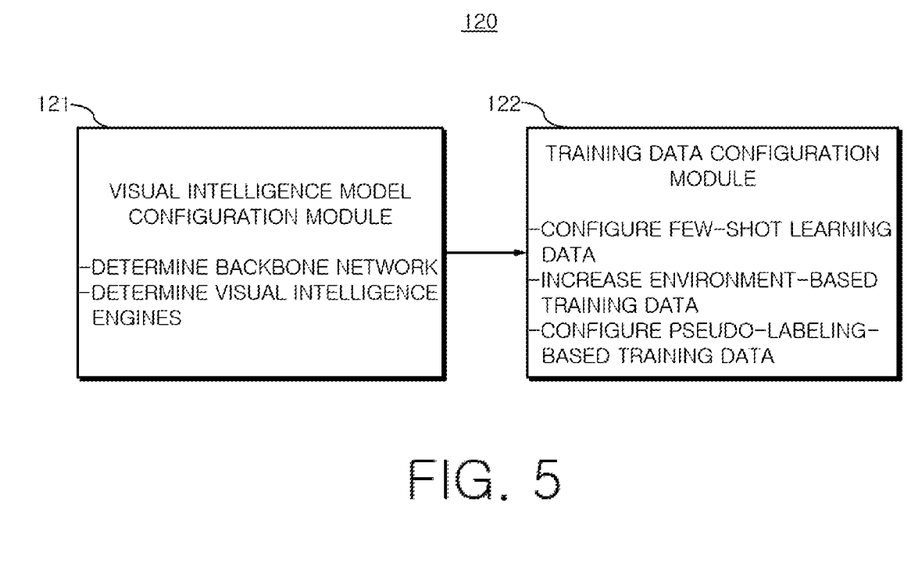
FIG. 5 is a view illustrating a detailed configuration of a hypothesis formulation module.

FIG. 5 is a view illustrating a detailed configuration of the hypothesis formulation module 120. The hypothesis formulation module 120 may include a visual intelligence model configuration module 121 and a training data configuration module 122 as shown in the drawing.

The visual intelligence model configuration module 121 may determine a backbone network and visual intelligence engines to configure the visual intelligence model, based on a changed visual context of the real world.

The change in the visual context of the real world refers to a change in an object and an environment as described above. Accordingly, according to what does an object/environment changes to and/or how the object/environment changes, an appropriate backbone network may be determined and necessary visual intelligence engines (an object recognition engine, a region division engine, a behavior recognition engine, an emotion recognition engine) may be determined.

The training data configuration module 122 may configure training data from the data that is prepared by the data collection module 112 of the training preparation module 110, based on the changed visual context of the real world.

Like the visual intelligence model, a configuration method of the training data may vary according to what does the object/environment changes to and/or how the object/environment changes. Specifically, the training data configuration module 122 may configure the training data by extracting important data and enrichment data which are appropriate for few-shot learning based on the changed object, may increase the training data according to an increasing method appropriate for the changed environment, and may configure pseudo-labeling-based training data for training the determined visual intelligence engines.

Figure 6:
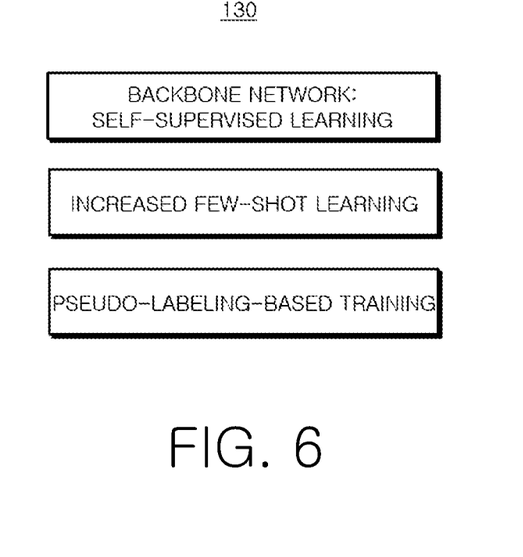
FIG. 6 is a view provided to explain a function of a hypothesis-based training module.

The hypothesis-based training module 130 may train the visual intelligence model configured by the hypothesis formulation module 120 with the training data configured by the hypothesis formulation module 120. FIG. 6 is a view provided to explain a function of the hypothesis-based training module 130.

As shown in the drawing, the hypothesis-based training module 130 may train the backbone network of the visual intelligence model in a self-supervised learning method, and may train the visual intelligence engines with the increased few-shot learning data and the pseudo-labeling-based training data.

Figure 7:
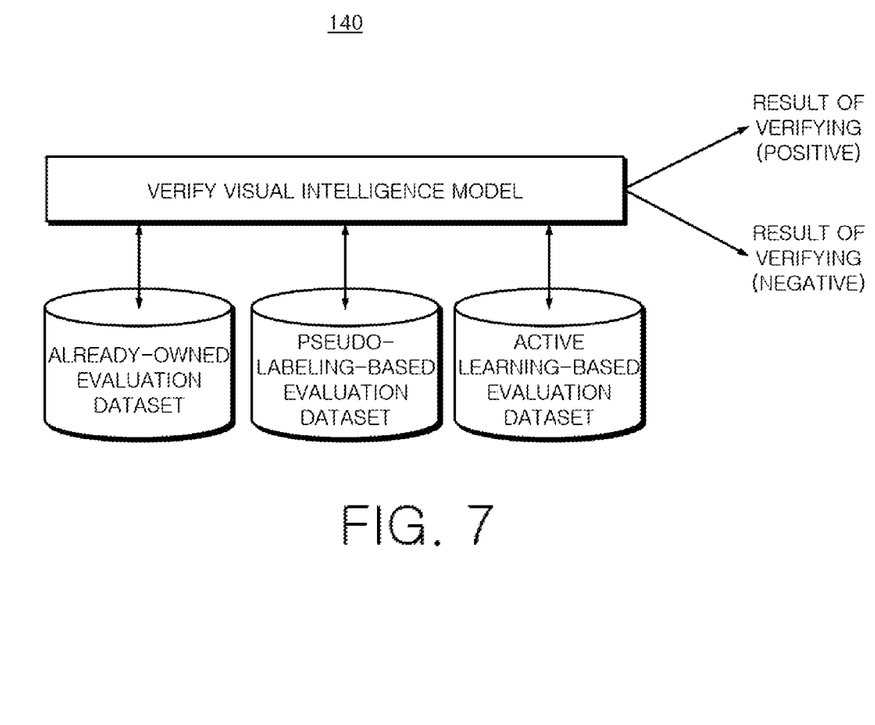
FIG. 7 is a view provided to explain a function of a hypothesis verification module.

The hypothesis verification module 140 may verify whether the hypothesis formulated by the hypothesis formulation module 120 is valid, by evaluating performance of the visual intelligence model trained by the hypothesis-based training module 130. FIG. 7 is a view provided to explain a function of the hypothesis verification module 140.

As shown in the drawing, the hypothesis verification module 140 may evaluate the visual intelligence model trained by the hypothesis-based training module 130, based on various evaluation datasets, such as already owned evaluation datasets, evaluation datasets established by a pseudo-labeling acquisition technique, and evaluation datasets selected based on active learning.

When a result of verifying by the hypothesis verification module 140 is negative, the hypothesis formulation module 120 may formulate a new hypothesis, that is, may reconfigure a visual intelligence model and may reconfigure training data. On the other hand, when the result of verifying by the hypothesis verification module 140 is positive, the visual intelligence model may be trained by the real world adaptive training module 150.

Figure 8:
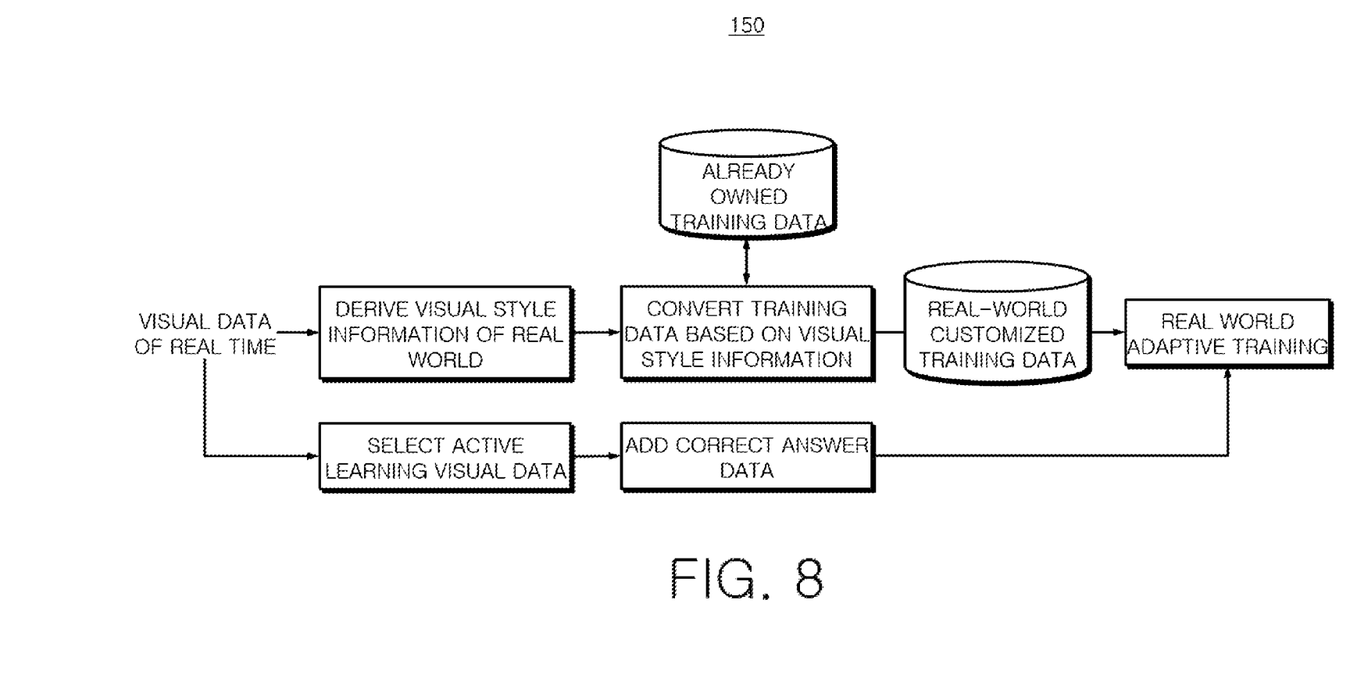
FIG. 8 is a view provided to explain a function of a real world adaptive training module.

The real world adaptive training module 150 may train the visual intelligence model trained by the hypothesis-based training module 130 to be optimized for the visual data of the real world. FIG. 8 is a view provided to explain a function of the real world adaptive training module 150.

As shown in the drawing, training data for real-world adaptive training may be generated in the following two methods.

The first method may be deriving visual style information regarding the environment of the real world from visual data of the real world, and generating real-world customized training data by converting already owned training data based on the derived visual style information.

The second method may be selecting visual data for active learning of the visual intelligence model from the visual data of the real world, and generating training data for adapting to the real world by adding correct answer data (label) to the selected visual data by a person or a management system.

Figure 9:
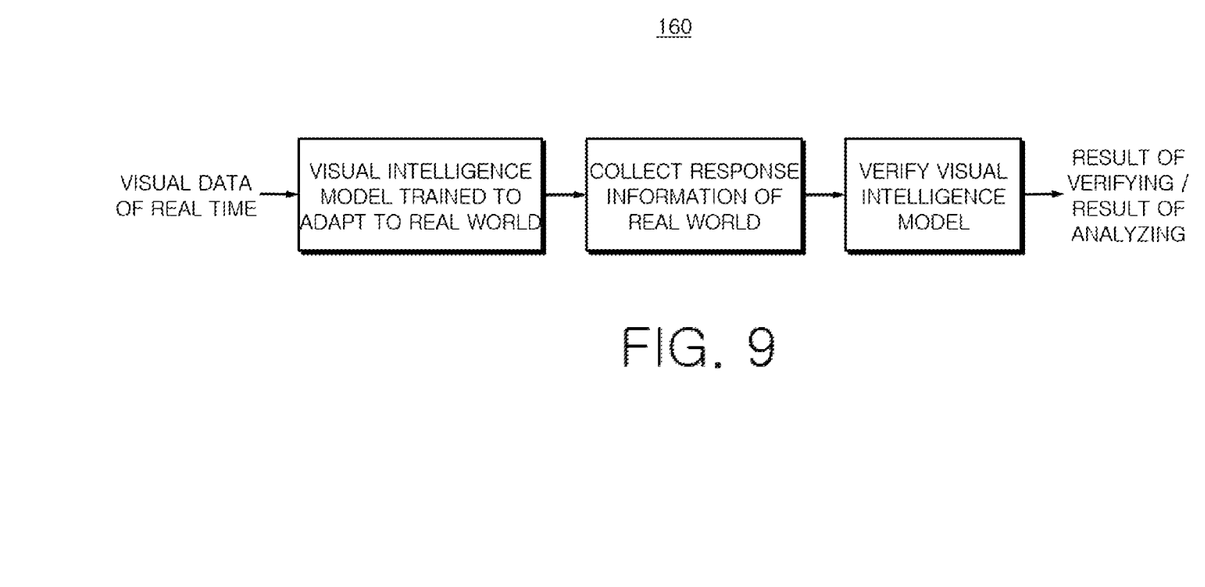
FIG. 9 is a view provided to explain a function of a real world verification module.

The real-world verification module 160 may verify whether the hypothesis formulated by the hypothesis formulation module 120 is valid again, by evaluating the visual intelligence model trained by the real world adaptive training module 150. FIG. 9 is a view provided to explain a function of the real world verification module 160.

As shown in the drawing, the real world verification module 160 may collect response information of the real world as to a result of visual perception/recognition, which is generated by inputting visual data of the real world to the trained visual intelligence model.

The response information of the real world may be response information regarding whether a service of the real world provided based on the result of visual perception/recognition by the visual intelligence model is appropriate. For example, the response information may indicate whether dispatching a security guard in response to a result of visual perception/recognition in an image security service is appropriate, whether a robot action in response to a result of visual perception/recognition is appropriate, or whether a face of a person receiving a visual intelligence-based service has a positive expression.

The real-world verification module 160 may statically analyze the response information of the real world, and may verify whether performance of the visual intelligence model trained by the real world adaptive training module 150 is positive.

When the result of verifying by the real world verification module 160 is negative, the hypothesis formulation module 120 may formulate a new hypothesis, that is, may reconfigure a visual intelligence model and may reconfigure training data.

Furthermore, a result of statistically analyzing the response information of the real world by the real world verification module 160 may be provided to the hypothesis formulation module 120. The result of analyzing may be referred to when a hypothesis is formulated by the hypothesis formulation module 120.

Up to now, the self-directed visual intelligence system has been described with reference to preferred embodiments.

In an embodiment of the disclosure, a visual intelligence model may be corrected/improved in a self-directed way according to a change in a visual context of a real world, and may be grown/advanced by itself, so that performance of the visual intelligence model may be maintained in a best state even in response to any change in the context of the real world.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A self-directed visual intelligence system comprising:
one or more processors comprising:
a training preparation module configured to prepare data necessary for training a visual intelligence model when a change in a visual context of a real world is recognized;
a configuration module configured to configure a visual intelligence model and to configure training data of the visual intelligence model, based on the changed visual context of the real world;

a first training module configured to train the visual intelligence model configured by the configuration module with the training data configured by the configuration module;

a first verification module configured to evaluate performance of the visual intelligence model trained by the first training module; and a second training module configured to train the visual intelligence model trained by the first training module by using the visual data of the real world when a result of verifying by the first verification module is positive.

2. The self-directed visual intelligence system of claim 1, wherein the training preparation module comprises:

a change recognition module configured to recognize the change in the visual context of the real world, based on a scene change in visual data regarding the real world; and a collection module configured to collect data necessary for training the visual intelligence model when the change in the visual context of the real world is recognized by the change recognition module, and wherein the change recognition module is configured to:

configure a scene graph from the visual data regarding the real world;

extract a feature vector of the scene graph and determine a scene change;

when the scene change is determined, derive a changed factor from the scene graph; and recognize the change in the visual context of the real world, based on the determined scene change and the derived changed factor, and wherein the collection module is configured to:

select important data from the visual data of the real world; and generate enrichment data by enriching a part of the visual data of the real world.

3. The self-directed visual intelligence system of claim 2, wherein the configuration module comprises:

a model determination module configured to determine a backbone network and visual intelligence engines to configure the visual intelligence model, based on the changed visual context of the real world; and a training data configuration module configured to configure training data from the data prepared by the training preparation module, based on the changed visual context of the real world, wherein the change in the visual context of the real world is a change in at least one of an object and an environment of the real world, wherein the visual intelligence engines comprise at least one of an object recognition engine, a region division engine, a behavior recognition engine, an emotion recognition engine, and wherein the training data comprises at least one of training data which is configured by extracting the important data and the enrichment data which are appropriate for few-shot learning based on the changed object, training data which increases according to an increasing method appropriate for the changed environment, and pseudo-labeling-based training data which is for training the visual intelligence engines.

4. The self-directed visual intelligence system of claim 1, wherein the configuration module is configured to reconfigure a visual intelligence model and training data when a result of verifying by the first verification module is negative.

5. The self-directed visual intelligence system of claim 1, wherein the second training module is configured to derive visual style information regarding an environment of the real world from visual data of the real world, to select visual data for active learning of the visual intelligence model from training data generated by converting the already owned training data based on the derived visual style information, and from the visual data of the real world, and to train the visual intelligence model with training data in which correct answer data is added to the selected visual data.

6. The self-directed visual intelligence system of claim 5, further comprising a second verification module configured to evaluate performance of the visual intelligence model trained by the second training module, wherein the configuration module is configured to reconfigure a visual intelligence model and training data when a result of verifying by the second verification module is negative.

7. The self-directed visual intelligence system of claim 6, wherein the second verification module is configured to evaluate the performance of the visual intelligence model by statically analyzing response information of the real world as to a result of visual recognition/perception which is generated by inputting the visual data of the real world to the trained visual intelligence model.

8. The self-directed visual intelligence system of claim 7, wherein the second verification module is configured to transmit a result of statically analyzing to the configuration module, and wherein the configuration module is configured to refer to the result of statically analyzing in configuring the visual intelligence model and the training data.

9. A self-directed visual intelligence model operating method, the method comprising:

preparing data necessary for training a visual intelligence model when a change in a visual context of a real world is recognized;

configuring a visual intelligence model and configuring training data of the visual intelligence model, based on the changed visual context of the real world;

performing a first training of the visual intelligence model with the training data; and a first verification step of evaluating performance of the visual intelligence model trained at the first training step; and performing a second training of the visual intelligence model by using the visual data of the real world when a result of verifying by the first verification module is positive.

10. The method of claim 9, comprising recognizing the change in the visual context of the real world, based on a scene change in visual data regarding the real world; and collecting data necessary for training the visual intelligence model when the change in the visual context of the real world is recognized, and wherein the recognizing further comprises:

configuring a scene graph from the visual data regarding the real world;

extracting a feature vector of the scene graph and determine a scene change;

when the scene change is determined, deriving a changed factor from the scene graph; and recognizing the change in the visual context of the real world, based on the determined scene change and the derived changed factor, and wherein the collecting further comprises:
  selecting important data from the visual data of the real world; and
  generating enrichment data by enriching a part of the visual data of the real world.

11. The method of claim 10, wherein the configuring the visual intelligence model further comprises:
  determining a backbone network and visual intelligence engines to configure the visual intelligence model, based on the changed visual context of the real world; and
  configuring training data from the data prepared by the training preparation module, based on the changed visual context of the real world,
  wherein the change in the visual context of the real world is a change in at least one of an object and an environment of the real world,
  wherein the visual intelligence engines comprise at least one of an object recognition engine, a region division engine, a behavior recognition engine, an emotion recognition engine, and
  wherein the training data comprises at least one of training data which is configured by extracting the important data and the enrichment data which are appropriate for few-shot learning based on the changed object, training data which increases according to an increasing method appropriate for the changed environment, and pseudo-labeling-based training data which is for training the visual intelligence engines.

12. The method of claim 9, wherein the configuring further comprises reconfiguring a visual intelligence model and training data when a result of verifying by the first verification module is negative.

13. The method of claim 9, wherein the performing a second training of the visual intelligence model further comprises deriving visual style information regarding an environment of the real world from visual data of the real world, selecting visual data for active learning of the visual intelligence model from training data generated by converting the already owned training data based on the derived visual style information, and from the visual data of the real world, and training the visual intelligence model with training data in which correct answer data is added to the selected visual data.

14. The method of claim 13, further comprising evaluating performance of the visual intelligence model trained by the second training module, and
  reconfiguring a visual intelligence model and training data when a result of verifying by the second verification module is negative.

15. The method of claim 14, wherein the evaluating comprises evaluating the performance of the visual intelligence model by statically analyzing response information of the real world as to a result of visual recognition/perception which is generated by inputting the visual data of the real world to the trained visual intelligence model.

16. The method of claim 15, wherein the evaluating further comprises transmitting a result of statically analyzing to a configuration module, and
  referring to the result of statically analyzing in configuring the visual intelligence model and the training data.

17. A self-directed visual intelligence system comprising:
  one or more processors comprising:
  a configuration module configured to configure a visual intelligence model and to configure training data of the visual intelligence model, based on a visual context of a real world;
  a first training module configured to train the visual intelligence model configured by the configuration module with the training data configured by the configuration module;
  a first verification module configured to evaluate performance of the visual intelligence model trained by the first training module;
  a second training module configured to train the visual intelligence model trained by the first training module by using the visual data of the real world when a result of verifying by the first verification module is positive; and
  a second verification module configured to evaluate performance of the visual intelligence model trained by the second training module.

* * * * *